United States Patent
Han et al.

(10) Patent No.: US 10,850,692 B2
(45) Date of Patent: Dec. 1, 2020

(54) VEHICLE AND METHOD OF CONTROLLING THE SAME

(71) Applicants: Hyundai Motor Company, Seoul (KR); Kia Motors Corporation, Seoul (KR)

(72) Inventors: SangJae Han, Hwaseong-si (KR); Seongho Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/577,512

(22) Filed: Sep. 20, 2019

(65) Prior Publication Data

US 2020/0180531 A1    Jun. 11, 2020

(30) Foreign Application Priority Data

Dec. 10, 2018    (KR) ........................ 10-2018-0158580

(51) Int. Cl.
*B60R 16/033*    (2006.01)
*H02J 7/00*    (2006.01)
*G07C 5/00*    (2006.01)

(52) U.S. Cl.
CPC ............ *B60R 16/033* (2013.01); *G07C 5/004* (2013.01); *H02J 7/0063* (2013.01); *H02J 2007/0067* (2013.01)

(58) Field of Classification Search
CPC .................. B60R 16/033; H02J 7/0063; H02J 2007/0067; G07C 5/004; G07C 5/00
See application file for complete search history.

(56) References Cited

U.S. PATENT DOCUMENTS

2017/0176195 A1*  6/2017 Rajagopalan ...... G01C 21/3415
2018/0118186 A1*  5/2018 Yl ............................ B60L 58/10

* cited by examiner

*Primary Examiner* — Robert L Deberadinis
(74) *Attorney, Agent, or Firm* — Slater Matsil, LLLP

(57) ABSTRACT

A vehicle includes a battery, a number of convenience loads, and a power management apparatus configured to control operations of the plurality of convenience loads based on a state of charge of the battery. The power management apparatus may store a power consumption table including power consumption depending on operation levels of the plurality of convenience loads and a priority depending on the operation levels of the plurality of convenience loads, calculate an amount of power availability based on the state of charge of the battery, calculate an amount of power consumption based on operation information of the plurality of convenience loads, and lower the operation levels of the convenience loads based on the power consumption table when the amount of power consumption is greater than the amount of power availability.

20 Claims, 15 Drawing Sheets

VEHICLE AND METHOD OF CONTROLLING THE SAME

CROSS-REFERENCE TO RELATED APPLICATIONS

This application claims priority to Korean Patent Application No. 10-2018-0158580, filed in the Korean Intellectual Property Office on Dec. 10, 2018, which application is hereby incorporated herein by reference.

TECHNICAL FIELD

Embodiments of the disclosure relate to a vehicle and a method of controlling the vehicle and, in particular embodiments, to a vehicle capable of efficiently managing a battery and a method of controlling the vehicle.

BACKGROUND

In general, a vehicle is a transportation means for driving on a road and railway using fossil fuels and electricity as a power source. For example, the vehicle may drive using power generated from an engine.

The vehicle may include a starter motor for starting the engine and a battery for supplying power to the starter motor. When the battery is discharged due to the power supply to the starter motor, a generator for charging the battery may be provided.

In recent years, the vehicle has been provided with various electronic components for protecting a driver and providing the driver with convenience and entertainment. Particularly, the vehicle is provided with the electronic components that consume large amounts of power, such as power steering and seat heating.

The electronic components are powered from the battery. As a result, power consumption of the battery increases, and it is difficult to maintain a charged amount, thus there is a problem that starting cannot be performed to restart the vehicle after parking, or the life of the battery is shortened.

In addition, there may be an imbalance between power generation by the generator in the vehicle and power consumption by the electronic components. When more power is consumed than the additional available power that is affected by the battery charge, it can cause adverse effects such as dropping a voltage of power supplied to the electronic components. For example, when a power shortage occurs due to power consumption of a momentary large capacity electric load, the voltage of the entire electrical system of the vehicle may drop, and initialization of the electronic components, deterioration of performance, abnormal communication, malfunction, etc. may occur.

SUMMARY

Therefore, it is an aspect of the disclosure to provide a vehicle capable of efficiently limiting power consumption of a battery and maintaining a battery charge/discharge balance, and a method of controlling the vehicle.

It is another aspect of the disclosure to provide a vehicle capable of controlling power consumption of electronic components using in-vehicle communication in response to a shortage of momentary power supply, and a method of controlling the vehicle.

Additional aspects of the disclosure will be set forth in part in the description which follows and, in part, will be obvious from the description, or may be learned by practice of the disclosure.

In accordance with an aspect of the disclosure, a vehicle includes a battery, a plurality of convenience loads, and a power management apparatus configured to control operations of the plurality of convenience loads based on a state of charge of the battery. The power management apparatus may store a power consumption table including power consumption depending on operation levels of the plurality of convenience loads and a priority depending on the operation levels of the plurality of convenience loads, calculate an amount of power availability based on the state of charge of the battery, calculate an amount of power consumption based on operation information of the plurality of convenience loads, and lower the operation levels of the convenience loads based on the power consumption table when the amount of power consumption is greater than the amount of power availability.

The power management apparatus may reduce the power consumption of the convenience loads based on the power consumption table according to a first process when the amount of power consumption is greater than the amount of power availability, reduce the power consumption of the convenience loads based on the power consumption table according to the first process when a reference time has elapsed since the convenience load was operated by a user, and reduce the power consumption of the convenience loads based on the power consumption table according to a second process different from the first process when the reference time has not elapsed since the convenience load was operated by the user.

The power consumption table may include a plurality of rows and a plurality of columns. The plurality of columns may correspond to the plurality of convenience loads, respectively. The plurality of rows may correspond to the operation levels of the convenience loads, respectively.

The plurality of rows and the plurality of columns may have different priorities, respectively.

The plurality of rows and the plurality of columns of the power consumption table may include the amount of power consumption depending on the operation level of the plurality of convenience loads, respectively.

The power management apparatus may sum values of the respective rows and columns according to a predetermined priority of the respective rows and columns when the amount of power consumption is greater than the amount of power availability, reduce the amount of power consumption of the convenience load, which corresponds to the remaining rows and columns, when the sum of the values of the rows and columns is greater than the amount of power availability.

The power management apparatus may raise a priority of the convenience load operated by a user when the convenience load is operated by the user.

The power management apparatus may change positions of values of columns, which correspond to the convenience load operated by the user, in the power consumption table.

The power management apparatus may sum values of the respective rows and columns according to a predetermined priority of the respective rows and columns when a reference time has elapsed since the convenience load was operated by the user, and reduce the amount of power consumption of the convenience load corresponding to the remaining rows and columns when the sum of the values of the rows and columns is greater than the amount of power availability.

The power management apparatus may sum all the values of the columns, which correspond to the convenience load operated by the user when a reference time has not elapsed since the convenience load was operated by the user, and then sum the values of the respective rows and columns according to a predetermined priority of the respective rows and columns, and reduce the amount of power consumption of the convenience load corresponding to the remaining rows and columns when the sum of the values of the rows and columns is greater than the amount of power availability.

In accordance with another aspect of the disclosure, a method of controlling a vehicle that includes a battery and a plurality of convenience loads, the method including: storing a power consumption table including power consumption depending on operation levels of the plurality of convenience loads and a priority depending on the operation levels of the plurality of convenience loads; calculating an amount of power availability based on the state of charge of the battery; calculating an amount of power consumption based on operation information of the plurality of convenience loads; and lowering the operation levels of the convenience loads based on the power consumption table when the amount of power consumption is greater than the amount of power availability.

The lowering of the operation levels of the convenience loads may include: when the amount of power consumption is greater than the amount of power availability, reducing the power consumption of the convenience loads based on the power consumption table according to a first process. When a reference time has elapsed since the convenience load was operated by a user, the power consumption of the convenience loads is reduced based on power consumption table according to the first process. When the reference time has not elapsed since the convenience load was operated by the user, the power consumption of the convenience loads is reduced based on the power consumption table according to a second process different from the first process.

The power consumption table may include a plurality of rows and a plurality of columns. The plurality of columns may correspond to the plurality of convenience loads, respectively. The plurality of rows may correspond to the operation levels of the convenience loads, respectively.

The plurality of rows and the plurality of columns may have different priorities, respectively.

The plurality of rows and the plurality of columns of the power consumption table may include the amount of power consumption depending on the operation level of the plurality of convenience loads, respectively.

The lowering of the operation levels of the convenience loads may include: when the amount of power consumption is greater than the amount of power availability, summing values of the respective rows and columns according to a predetermined priority of the respective rows and columns; and when the sum of the values of the rows and columns is greater than the amount of power availability, reducing the amount of power consumption of the convenience load corresponding to the remaining rows and columns.

The lowering of the operation levels of the convenience loads may include raising a priority of the convenience load operated by a user when the convenience load is operated by the user.

The lowering of the operation levels of the convenience loads may include changing positions of values of columns, which correspond to the convenience load operated by the user, in the power consumption table.

The lowering of the operation levels of the convenience loads may include: when a reference time has elapsed since the convenience load was operated by the user, summing the values of the respective rows and columns according to a predetermined priority of the respective rows and columns; and when the sum of the values of the rows and columns is greater than the amount of power availability, reducing the amount of power consumption of the convenience load corresponding to the remaining rows and columns.

The lowering of the operation levels of the convenience loads may include: when a reference time has not elapsed since the convenience load was operated by the user, summing all the values of the columns, which correspond to the convenience load operated by the user, and then summing the values of the respective rows and columns according to a predetermined priority of the respective rows and columns; and when the sum of the values of the rows and columns is greater than the amount of power availability, reducing the amount of power consumption of the convenience load corresponding to the remaining rows and columns.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF ILLUSTRATIVE EMBODIMENTS

Hereinafter, an operation principle and embodiments of the disclosure will be described with reference to accompanying drawings.

Figure 1:
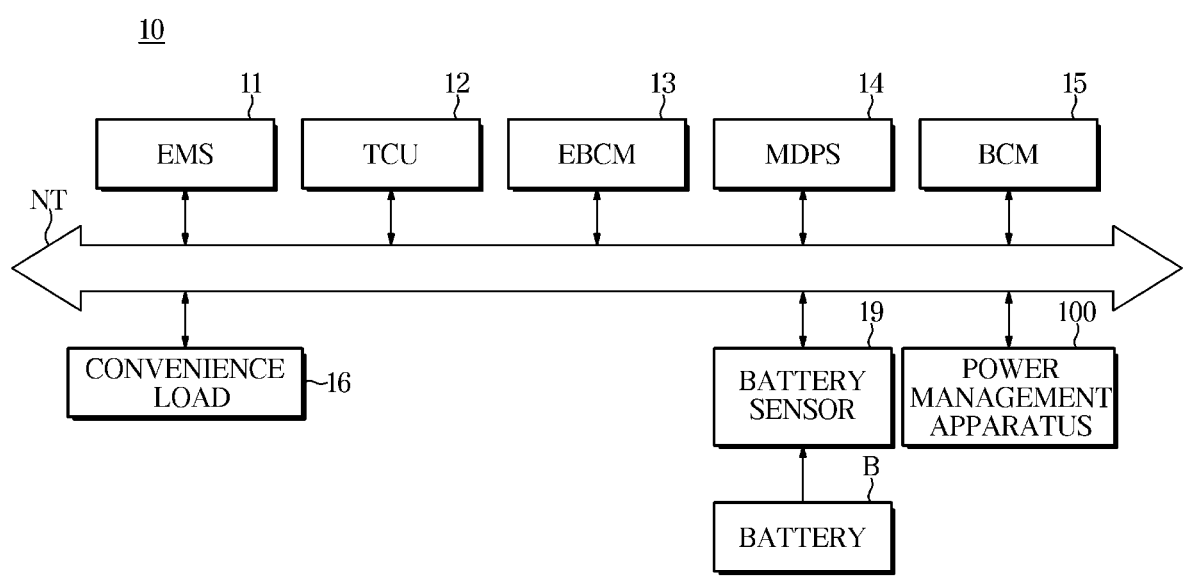
FIG. 1 is a view illustrating an electrical configuration of a vehicle according to embodiments of the disclosure.

FIG. 1 is a view illustrating an electrical configuration of a vehicle according to embodiments of the disclosure.

A vehicle may include a body forming an external appearance of the vehicle and accommodates a driver and/or cargo, a chassis having components of the vehicle other than the body, and electronic components 10 protecting the driver and providing convenience to the driver.

For example, as illustrated in FIG. 1, the electronic components 10 may include an engine management system (EMS) 11, a transmission control unit (TCU) 12, an electronic brake control module (EBCM) 13, motor-driven power steering (MDPS) 14, a body control module (BCM) 15, a convenience load 16, a battery sensor 19, and a power management apparatus 100. In addition, a battery B that supplies power to the electronic components 10 may be provided.

The engine management system 11 may control the operation of an engine in response to the driver's acceleration command through an accelerator pedal, and may manage the engine. For example, the engine management system 11 may perform engine torque control, fuel consumption control, engine failure diagnosis, and/or generator control.

The transmission control unit 12 may control the operation of a transmission in response to the driver's shift command through a shift lever or a driving speed of the vehicle. For example, the transmission control unit 12 may perform clutch control, shift control, and/or engine torque control during shifting.

The electronic brake control module 13 may control an electronic braking apparatus of the vehicle in response to the driver's braking command through a brake pedal, and maintain the balance of the vehicle. For example, the electronic brake control module 13 may perform automatic parking brake control, slip prevention during braking, and/or slip prevention during steering.

The motor-driven power steering 14 may assist the driver to easily operate a steering wheel 23a. For example, the motor-driven power steering 14 may assist the driver's steering operation to reduce a steering force during low-speed driving or parking and to increase the steering force during high-speed driving.

The body control module 15 may control operations of electronic components for providing the driver with convenience or securing the driver's safety. For example, the body control module 15 may control door lock devices, head lamps, wipers, power seats, seat heaters, a cluster, a room lamp, navigation system, a multifunctional switch, and the like, which are installed in the vehicle.

The convenience load 16 may be a device that provides convenience to the driver. The convenience load 16 may include, for example, an audio device, a heating/ventilation/air conditioning (HVAC) system, a navigation device, a power seat, a seat heater, a room lamp, etc.

The battery B may store electrical energy generated from the power of the engine and supply the power to the various electronic components 10 included in the vehicle. For example, when the vehicle drives, a generator may convert a rotational energy of the engine into electrical energy, and the battery B may receive and store the electrical energy from the generator. In addition, the battery B may supply power for starting the engine to the starter motor in order to drive the vehicle, and may supply power to the electronic components 10 of the vehicle.

The battery sensor 19 may obtain state information related to the battery B. For example, the battery sensor 19 may measure and output an output voltage of the battery B, an output current of the battery B, a temperature of the battery B, a rated capacity Cb of the battery B, and the like.

The power management apparatus 100 may obtain the output voltage of the battery B, the output current of the battery B, the temperature of the battery B, the rated capacity Cb of the battery B from the battery sensor 19, etc., and may calculate a state of charge (SOC) of the battery B.

Here, the SOC of the battery B may represent the degree of storing the electrical energy in the battery B. The SOC of the battery B generally has a value of 0 to 100% and may represent the degree to which the battery B is charged between a fully discharged state (0%) and a full SOC (100%).

The power management apparatus 100 may control the generator through the engine management system 11 based on the SOC of the battery B. For example, the power management apparatus 100 may increase or decrease the generated power (or a generated voltage) of the generator based on the SOC of the battery B. Particularly, the power management apparatus 100 may control the generator so that the SOC of the battery B is maintained at a predetermined level or more.

The electronic components 10 may communicate with each other through a vehicle communication network NT. For example, the electronic components 10 may transmit and receive data through Ethernet, Media Oriented Systems Transport (MOST), Flexray, Controller Area Network (CAN), Local Interconnect Network (LIN), and the like.

Figure 2:
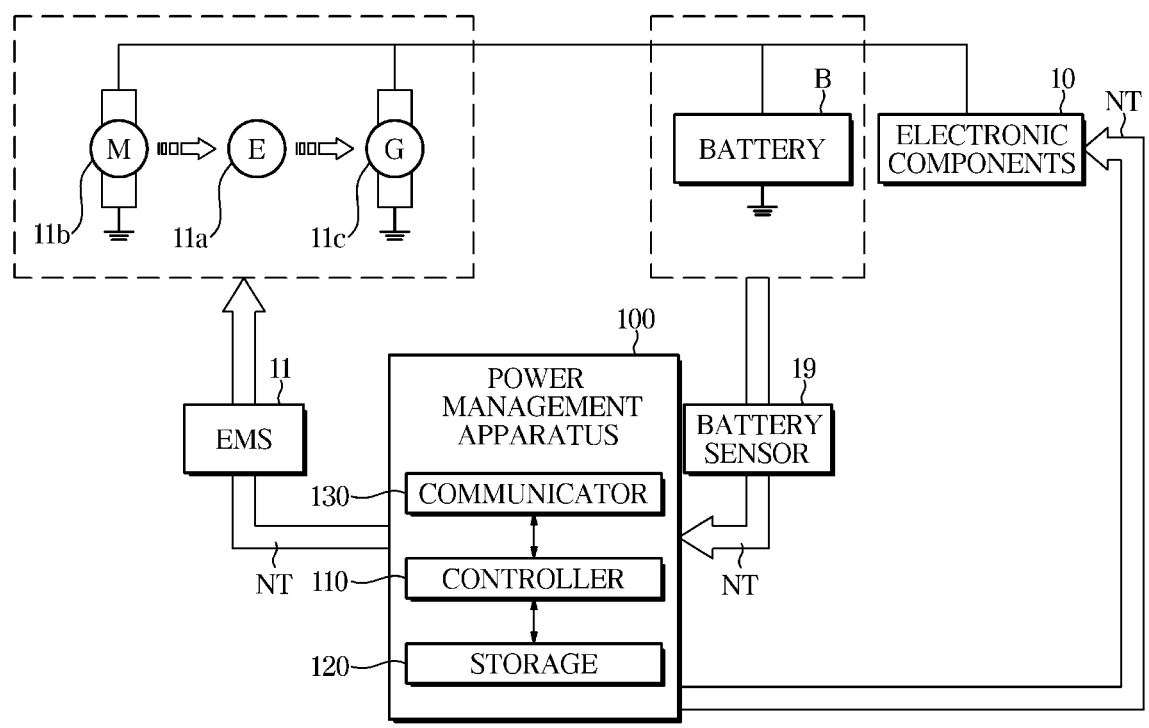
FIG. 2 is a view illustrating a configuration of a power management apparatus according to embodiments of the disclosure.

FIG. 2 is a view illustrating a configuration of a power management apparatus according to embodiments of the disclosure.

As illustrated in FIG. 2, the vehicle may include a starter motor 11b, an engine 11a, a generator 11c, the battery B, the electronic components 10, and the power management apparatus 100.

The starter motor 11b may provide power to the engine 11a to start the engine 11a while the engine 11a is stopped. The starter motor 11b may receive power from the battery B. Since the starter motor 11b consumes a large amount of power to start the engine 11a, the battery B maintains the SOC of the predetermined level or more (for example, the SOC of about 30% or more) for the operation of the starter motor 11b.

The generator 11c may generate electrical energy, that is, power, by the power of the engine 11a. The engine 11a may generate the power using explosive combustion of fuel, and the power of the engine 11a may be transmitted to a wheel through the transmission. At this time, part of a rotational force generated by the engine 11a may be supplied to the generator 11c, and the generator 11c may generate the power from the power of the engine 11a.

The generator 11c may comprise, for example, a rotator having a field coil and a stator having an armature coil. The rotor may be rotated by the rotation of the engine 11a, and the stator may be fixed. When a current is supplied to the field coil while the rotor is rotating by the engine 11a, a rotating magnetic field is generated, and an induced current is induced in the armature coil due to the rotating magnetic field.

Thereby, the generator 11c may generate electric power. Further, a magnitude of the magnetic field generated by the rotor may change according to a magnitude of the current supplied to the field coil, and a magnitude of the induced current generated in the armature coil may change. In other words, the amount of power generated by the generator 21e may be controlled according to the magnitude of the current supplied to the field coil of the rotor.

A part of the power generated by the generator 11c may be supplied to the electronic components 10 of the vehicle and the other part may be stored in the battery B of the vehicle. In other words, the power generated by the generator 21e may be supplied to the electronic components 10, and the remaining power may be stored in the battery B.

The battery B may supply the power for starting the engine 11a to the starter motor 11b when the engine 11a stops and supply the power to the electronic components 10 of the vehicle. For example, when the power consumed by the electronic components 10 while driving of the vehicle is greater than the power generated by the generator 11c, the battery B may supply the power to the electronic components 10. The battery B may supply the power to the electronic components 10 during parking while the engine 11a is stopped.

The power management apparatus 100 may obtain the state information of the battery B through the battery sensor 19 and control the amount of power generated by the generator 11c through the engine management system 11 in accordance with the state information of the battery B.

Particularly, the battery sensor 19 may collect the state information of the battery B such as the output voltage of the battery B, the output current of the battery B, the temperature of the battery B, and the rated capacity Cb of the battery B. The power management apparatus 100 may receive the state information of the battery B from the battery sensor 19 through the vehicle communication network NT. The power management apparatus 100 may generate a power generation control request for controlling the amount of power generated by the generator 11c according to the state information of the battery B. The power management apparatus 100 may transmit the power generation control request to the engine management system 11 through the vehicle communication network NT and the engine management system 11 may increase or decrease the amount of power generated by the generator 11c in response to the power generation control request of the power management apparatus 100.

The power management apparatus 100 may include a communicator 130, a storage 120, and a controller 110.

The communicator 130 may include a CAN transceiver for receiving a communication signal from the electronic components 10 and transmitting the communication signal to the electronic components 10 through a communication network (CNT), and a communication controller for controlling operations of the CAN transceiver.

The CAN transceiver may receive communication data from the electronic components 10 through the vehicle communication network NT and output the communication data to the controller 110. The CAN transceiver 111 may receive the communication data from the controller 110, and transmit the communication data to the electronic components 10 through the vehicle communication network NT.

For example, the CAN transceiver may receive operation information of the generator 11c and the state information of the battery B from the battery sensor 19 through the vehicle communication network NT. In addition, the CAN transceiver may receive information about the amount of power consumption, the amount of power consumption variation, and an operation state from the electronic components 10 through the vehicle communication network NT under specific conditions or periodically.

For example, the CAN transceiver may transmit the power generation control request to the engine management system 11 through the vehicle communication network NT, and the engine management system 11 may increase or decrease the amount of power generated by the generator 11c in response to the power generation control request. In addition, the CAN transceiver may transmit a power restriction request to the electronic components 10 through the vehicle communication network NT, and each of the electronic components 10 may limit power consumption in response to the power restriction request.

The communicator 130 may transmit and receive data with the electronic components 10 of the vehicle through the vehicle communication network NT and the power management apparatus 100 may communicate with the electronic components 10 such as the power management system 100 and the battery sensor 19 through the communicator 130.

The storage 120 may include a storage medium for storing control data for controlling the power management apparatus 100, and a storage controller for controlling storage/deletion/loading of data stored in the storage medium.

The storage medium may include a Solid State Drive (SSD) and a Hard Disc Drive (HDD), and the like, and may store various data for managing the SOC of the battery B.

The storage medium may store power generation information of the generator 1ie, charging information of the battery B, and consumption information of the electronic components 10 received through the communicator 130. In particular, the storage medium may store information regarding the operation state and the amount of power consumption of each of the electronic components 10. For example, the storage medium may store information about the operation state and the amount of power consumption of each of the electronic components 10 in the form of a table.

The storage 120 may store data in the storage medium according to a storage signal of the controller 110 and output data stored in the storage medium to the controller 110 according to a loading signal of the controller 110. For example, the storage controller may receive a request for the amount of power consumption of each of the electronic components 10 from the controller 110, and may provide a reference power consumption table 200 that includes the operation state and the amount of power consumption of each of the electronic components 10 to the controller 110.

The controller 110 may include a memory for storing control programs and/or control data for controlling the power management apparatus 100, and a processor for generating control signals according to control programs and control data stored in the memory.

The memory may temporarily store communication data received through the communicator 130 and/or stored data stored in the storage 120. For example, the communication data may include the power generation information of the generator 11c, the charging information of the battery B, and the consumption information of the electronic components 10 received through the communicator 130. The stored data may include the reference power consumption table 200 that includes the operation state and the amount of power consumption of each of the electronic components 10.

The memory may provide a program and/or data to the processor in accordance with a memory control signal of the processor.

The memory may include a volatile memory for temporarily storing data, such as Static Random Access Memory (S-RAM) and Dynamic Random Access Memory (D-RAM). In addition, the memory may include a non-volatile memory for storing data for the long-term, such as Read Only Memory (ROM), Erasable Programmable ROM (EPROM), and Electrically Erasable Programmable ROM (EEPROM).

The processor may include various logic circuits and arithmetic circuits, process data according to the program provided from the memory, and generate the control signals according to the processing results.

The processor may control a power generation operation of the generator 11c and control a power consumption operation of the electronic components 10, based on the power generation information of the generator 11c, the charging information of the battery B, and the consumption information of the electronic components 10. For example, the amount of power consumption of the electronic components 10 may be calculated by the maximum output possible power that the electronic components 10 can consume based on the amount of power generated by the generator 11c and the charging amount of the battery B.

In addition, the processor may calculate the amount of power availability of the convenience load 16, excluding the amount of basic power consumption of essential electronic components necessary for driving the engine, steering, braking, etc. at the maximum output available power. The power management apparatus 100 may control the power consumption of the convenience load 16 that provides comfort and convenience to the driver and the power consumption of the essential electronic components necessary for driving the engine, steering, braking, etc. are not controlled by the power management apparatus 100.

The processor may calculate the amount of power consumption of the convenience load 16 based on the power consumption of the electronic components 10 and compare the amount of power availability of the convenience load 16 with the amount of power consumption of the convenience load 16. When the amount of power consumption of the convenience load 16 is greater than the amount of power availability of the convenience load 16, the processor may generate the power restriction request to reduce the power consumption of the convenience load 16.

The processor may reduce the power consumption of each of the convenience loads 16 according to the operation state of each of the convenience loads 16. For example, the processor may select the convenience load 16 to reduce the power consumption according to the operation state of each of the convenience loads 16, and determine the power consumption to be reduced of the selected convenience load 16.

The processor may store in the memory the reference power consumption table 200 that includes a current operation state of each of the convenience loads 16 and the amount of power consumption. The operation state of the convenience load 16 may include an operation level of the convenience load 16 and/or a driving duty ratio of the convenience load 16. The reference power consumption table 200 of the memory is described in more detail below.

When the amount of power consumption of the convenience load 16 is greater than the amount of power availability of the convenience load 16, the processor may select the convenience load 16 to be reduced of the power consumption based on the reference power consumption table 200 stored in the memory, and determine the reduced power consumption of the convenience load 16. Selecting the convenience load 16 to reduce the power consumption and determining the reduced power consumption of the convenience load 16 is described in further detail below.

Thus, the controller 110 may calculate the amount of power availability of the convenience load 16 and reduce the power consumption of the convenience load 16 based on the amount of power availability of the convenience load 16.

Hereinafter, a specific method of reducing the power consumption of the convenience load 16 based on the power state of the vehicle by the power management apparatus 100 will be described.

Figure 3:
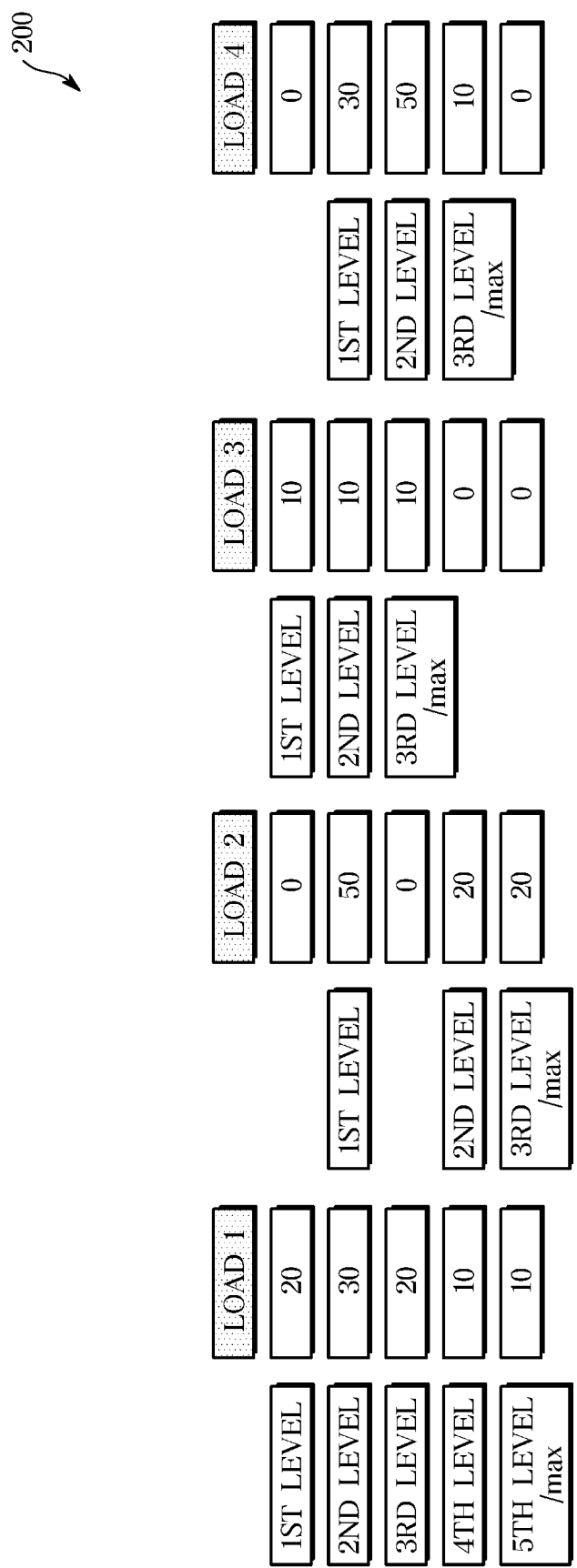
FIG. 3 is a view illustrating a reference power consumption table representing power consumption according to an operation state of a convenience load stored in a power management apparatus according to embodiments of the disclosure.

FIG. 3 is a view illustrating a reference power consumption table representing power consumption according to an operation state of a convenience load stored in a power management apparatus according to embodiments of the disclosure.

As illustrated in FIG. 3, the power management apparatus 100 may store the reference power consumption table 200 including the amount of power consumption according to the operation level and/or the driving duty ratio of the convenience load 16.

The column of the reference power consumption table 200 may represent the amount of power consumption of the same convenience load. A load 1 may have the operation level of a 5th level and may consume 20 W (watt) in a 1st level (stage). The load 1 may further consume an additional 30 W in addition to the 1st level in a 2nd level (stage), and may consume a total of 50 W in the 2nd level (stage). The load 1 may further consume 20 W in a 3rd level, further consume 10 W in a 4th level, and may further consume 10 W in the 5th level. A load 2 may consume 50 W in the 1st level, consume an additional 20 W in the 2nd level, and further consume 20 W in the 3rd level.

As such, the reference power consumption table 200 may store an increment of the power consumption in each of the rows in accordance with an increase of the operation level.

The convenience load 16 may have different operation levels. For example, the load 1 may have the operation level of the 5th level, while the load 2 may have the operation level of the 3rd level.

As a result, the reference power consumption table 200 may include a blank. For example, a first row of the load 2 is blank ('0'), a second row stores the power consumption of the 1st level, a third row is blank ('0'), a fourth row additional power consumption, and a fifth row stores the additional power consumption of the 3rd level. A position of the blank ('0') in the reference power consumption table 200 may be predetermined according to the importance of the corresponding convenience load 16, the amount of power consumption of the corresponding convenience load 16, and the like.

The power management apparatus 100 may receive the operation level and power consumption of the convenience load 16 received from the convenience load 16 through the vehicle communication network NT. The power management apparatus 100 may generate the reference power consumption table 200 based on the operation level and power consumption of the received convenience load 16 and may also store the reference power consumption table 200 in the storage 120. The power management apparatus 100 may store the reference power consumption table 200 in the storage 120 and then may update the reference power consumption table 200 stored in the storage 120 based on the operation level and power consumption of the convenience load 16 received through the communication network NT.

Figure 4:
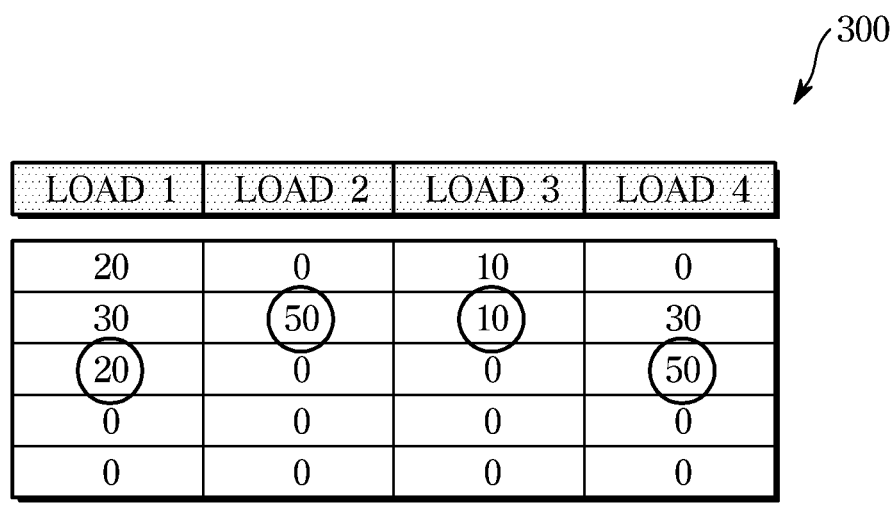
FIG. 4 is a view illustrating a current power consumption table representing current power consumption of a convenience load stored in a power management apparatus according to embodiments of the disclosure.

FIG. 4 is a view illustrating a current power consumption table representing current power consumption of a convenience load stored in a power management apparatus according to embodiments of the disclosure.

As illustrated in FIG. 4, the power management apparatus 100 may generate a current power consumption table 300 representing the current power consumption of the convenience load 16 according to the current operation level and/or the duty ratio of the convenience load 16.

The power management apparatus 100 may generate the current power consumption table 300 based on the reference power consumption table 200 and the current operation level of the convenience load 16.

The power management apparatus 100 may search for a column corresponding to the corresponding convenience load 16 among a plurality of columns included in the reference power consumption table 200 and search a row corresponding to the current operation level of the corresponding convenience load 16. The power management apparatus 100 may generate the current power consumption table 300 based on the power consumption up to the row corresponding to the current operation level of the corresponding convenience load 16 among the columns corresponding to the convenience load 16. Particularly, the power management apparatus 100 may input '0' in the rows below the row corresponding to the current operation level among the columns corresponding to the corresponding convenience load 16.

For example, when the operation level of the load 1 is the 3rd level, as illustrated in FIG. 4, the current power consumption table 300 may include the first row representing the 1st level of the load 1, the second row representing the 2nd level, and the third row representing the 3rd level in the reference power consumption table 200. Also, the fourth row representing the 4th level and the fifth row representing the 5th level of the load 1 of the reference power consumption table 200 may be input with '0.'

When the operation level of the load 2 is the 1st level, as illustrated in FIG. 4, the current power consumption table 300 may include the second row representing the 1st level of the load 2 and the first row less than the second row in the reference power consumption table 200. Also, the third row, the fourth row, and the fifth row of the load 2 of the reference power consumption table 200 may be input with '0.'

When the operation level of a load 3 is the 2nd level, as illustrated in FIG. 4, the current power consumption table 300 may include the second row representing the 2nd level of a load 4 and the first row less than the second row in the reference power consumption table 200. Also, the third row, the fourth row, and the fifth row of the load 3 of the reference power consumption table 200 may be input with '0.'

When the operation level of the load 4 is the 2nd level, as illustrated in FIG. 4, the current power consumption table 300 may include the third row representing the 2nd level of the load 4 and the first row and the second row less than the third row in the reference power consumption table 200. Also, the fourth row and the fifth row of the load 4 of the reference power consumption table 200 may be input with '0.'

The power management apparatus 100 may determine that the total amount of power consumption of the current convenience load 16 is 220 W based on the current power consumption table 300 as illustrated in FIG. 4.

The columns and rows of the current power consumption table 300 may represent the priority of the power consumption.

The left column of the current power consumption table 300 may have the highest priority and the right column of the current power consumption table 300 may have the lowest priority. For example, a first column of the current power consumption table 300 may have a higher priority than a second column, and the second column may have a higher priority than a third column.

The upper row of the current power consumption table 300 may have the highest priority and the lower row of the current power consumption table 300 may have the lowest priority. For example, the first row of the current power consumption table 300 may have a higher priority than the second row, and the second row of the current power consumption table 300 may have a higher priority than the third row.

The higher priority convenience load 16 may be maintained at the amount of power consumption or may have a slightly reduced amount of power consumption, even if the amount of power availability of the convenience load 16 is less than the amount of power consumption of the convenience load 16. On the other hand, the lower priority convenience load 16 may significantly reduce the amount of power consumption when the amount of power availability of the convenience load 16 is less than the amount of power consumption of the convenience load 16.

Figure 5:
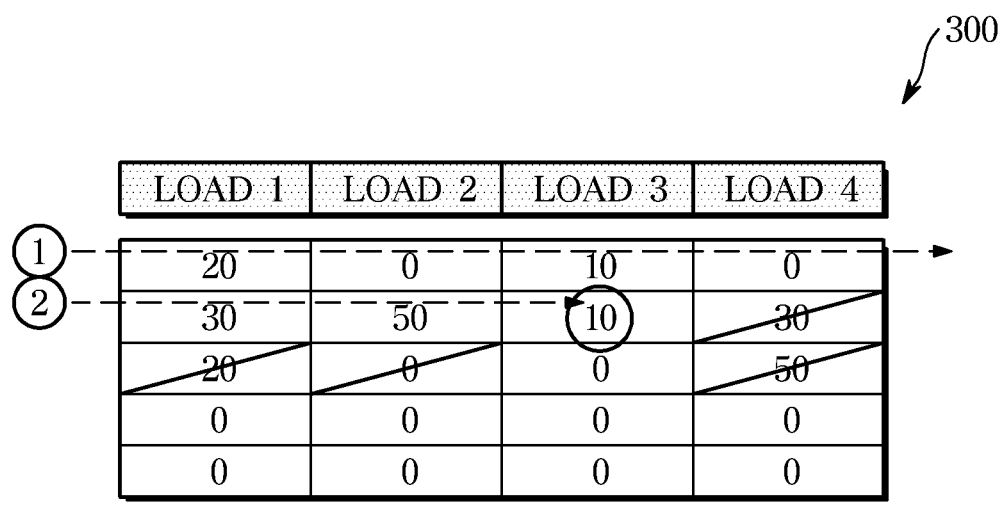
FIG. 5 is a view illustrating an example of reducing power consumption of a convenience load using a current power consumption table stored in a power management apparatus according to embodiments of the disclosure.

FIG. 5 is a view illustrating an example of reducing power consumption of a convenience load using a current power consumption table stored in a power management apparatus according to embodiments of the disclosure.

When the amount of power availability of the convenience load 16 is less than the amount of power consumption of the convenience load 16, the power management apparatus 100 may select the convenience load 16 to reduce the amount of power consumption based on the current power consumption table 300, and reduce the amount of power consumption of the selected convenience load 16. Particularly, the power management apparatus 100 may select the convenience load 16 to reduce the amount of power consumption based on the arrangement of rows and columns of the current power consumption table 300, and reduce the amount of power consumption of the selected convenience load 16.

For example, the current total amount of power consumption for the load 1, the load 2, the load 3, and the load 4 may be 220 W, and the amount of power availability of the convenience load 16 may be 140 W.

As illustrated in FIG. 5, the power management apparatus 100 may sum the values from the first row and the first column to the first row and a fourth column of the current power consumption table 300, sum the values from the second row and the first column to the second row and the fourth column, and sum the values from the third row and the first column to the third row and the fourth column. In other words, the power management apparatus 100 may sum the values from the left column to the right column of the upper row, and then sum the values from the left column to the right column of the lower row.

In addition, the power management apparatus 100 may determine whether the sum of the values of the respective rows and columns is greater than the amount of power availability of the convenience load 16 while summing the values of the respective rows and columns of the current power consumption table 300. When the sum of the values of the respective rows and columns is greater than the amount of power availability of the convenience load 16, the power management apparatus 100 may control the amount of power consumption of the convenience load 16 so that the values of the remaining rows and columns all become '0.'

According to FIG. 5, the values of the first row and the first column of the current power consumption table 300 may be 20, and the sum of the values up to the first row and the second column may be 20. In the same way, the sum of the values up to the first row and the fourth column may be 30. The sum of the values up to the second row and the first column may be 60, the value up to the second row and the second column may be no, and the sum of the values up to the second row and the third column may be 120. In addition, the sum of the values up to the second row and the fourth column may be 150.

The sum of the values up to the second row and the fourth column is greater than the amount of power availability 140 W of the convenience load 16. The power management apparatus 100 may control the amount of power consumption of the convenience load 16 so that the values of the remaining rows and columns from the second row and the fourth column become '0.' For example, the power management apparatus 100 may control the load 4 so that the amount of power consumption of the second row and the fourth column of the current power consumption table 300, that is, the 1st level of the load 4 becomes '0.' In other words, the power management apparatus 100 may turn off the load 4.

The power management apparatus 100 may also control the operation level of the load 1 to the 2nd level so that the amount of power consumption of the third row and the first column of the current power consumption table 300, that is, 3rd level or more levels of the load 1 to be '0.' The power management apparatus 100 may also control the operation level of the load 2 to the 1st level so that the amount of power consumption of the third row and the second column of the current power consumption table 300, that is, 2nd level or more levels of the load 2 to be '0.' The power management apparatus 100 may also control the operation level of the load 3 to the 2nd level so that the amount of power consumption of the third row and the third column of the current power consumption table 300, that is, 3rd level or more levels of the load 3 to be '0.'

Figure 6:
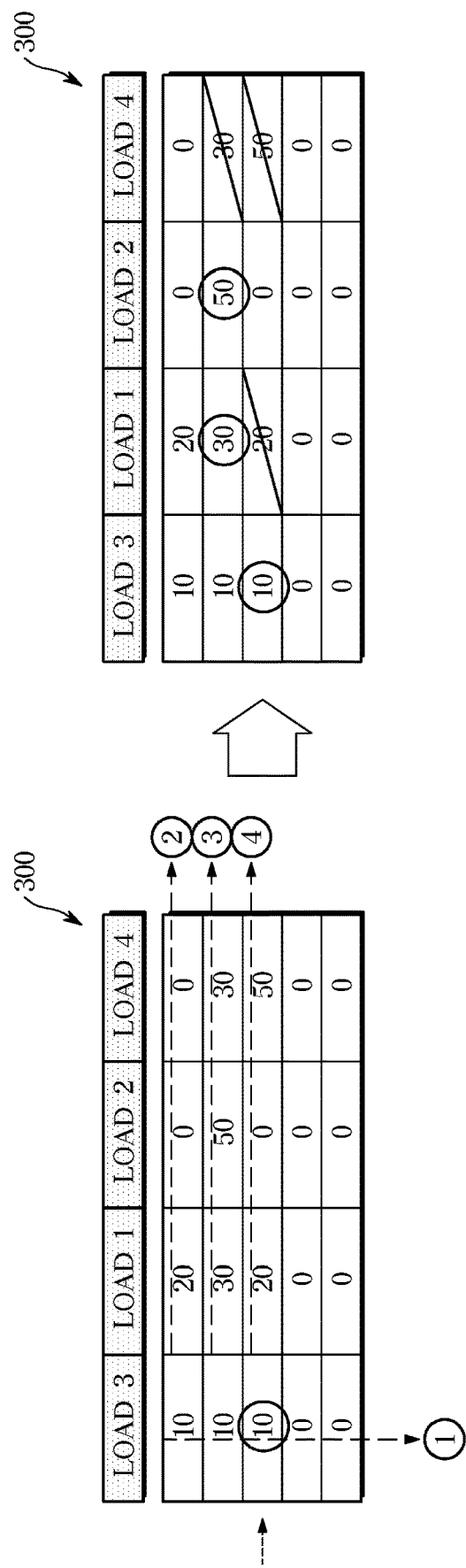
FIGS. 6 and 7 are views illustrating another example of reducing power consumption of a convenience load using a current power consumption table stored in a power management apparatus according to embodiments of the disclosure.
Figure 7:
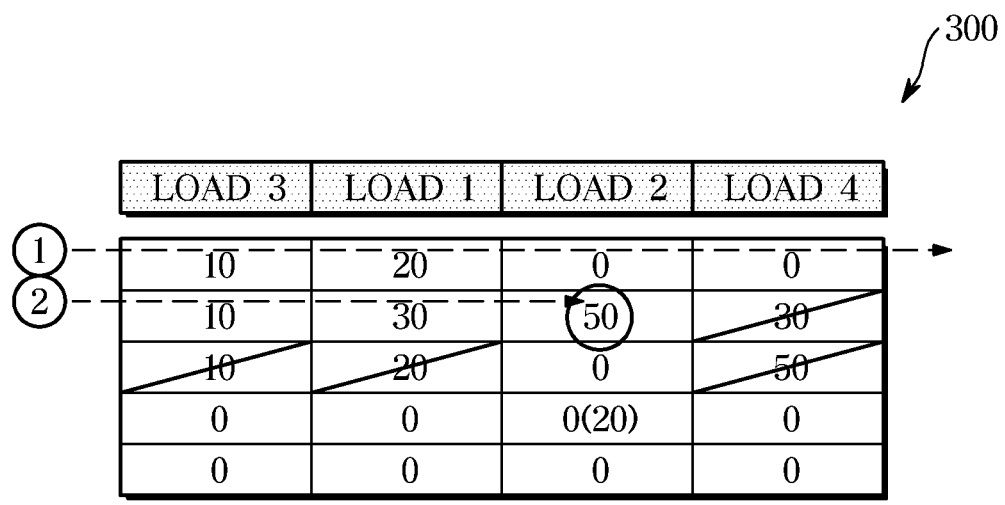

FIGS. 6 and 7 are views illustrating another example of reducing power consumption of a convenience load using a current power consumption table stored in a power management apparatus according to embodiments of the disclosure.

The priority of the convenience load 16 may be changed depending on the convenience load 16 of the user. The convenience load 16 that the user has recently used may have the higher priority.

The power management apparatus 100 may change the column of the current power consumption table 300 to change (raise) the priority of the convenience load 16 that the user has recently used. In other words, the power management apparatus 100 may move the column representing the convenience load 16 that the user has recently used to the leftmost column among the columns of the current power consumption table 300.

For example, when the user raises the operation level of the load 3 from the 2nd level to the 3rd level, the power management apparatus 100 may move the amount of power consumption of the load 3 to the first column of the current power consumption table 300, as illustrated in FIG. 6. The power management apparatus 100 may also move the amount of power consumption of the load 1 to the second column and move the amount of power consumption of the load 2 to the third column.

In addition, since the operation level of the load 3 becomes the 3rd level, the power management apparatus 100 may input '10' to the first row and the third column of the current power consumption table 300 based on the reference power consumption table 200.

When the amount of power availability of the convenience load 16 is less than the amount of power consumption of the convenience load 16, the power management apparatus 100 may select the convenience load 16 to reduce the amount of power consumption based on the current power consumption table 300, and reduce the amount of power consumption of the selected convenience load 16.

For example, the current total amount of power consumption for the load 1, the load 2, the load 3, and the load 4 may be 220 W, and the amount of power availability of the convenience load 16 may be 140 W.

The power consumption of the load 3 recently operated by the user has a high priority. The power management apparatus 100 may calculate the sum of all the values of the first column representing the amount of power consumption of the load 3 operated by the user as illustrated in FIG. 6. Then, the power management apparatus 100 may sum the values from the first row and the second column to the first row and the fourth column, sum the values from the second row and the second column to the second row and the fourth column, and sum the values from the third row and the second column to the third row and the fourth column.

As illustrated in FIG. 6, the sum of the first column of the current power consumption table 300 may be 30, and the sum of the values up to the second row and the fourth column may be 160. The sum of the values up to the second row and the fourth column is greater than the amount of power availability 140 W of the convenience load 16. The power management apparatus 100 may control the amount of power consumption of the convenience load 16 so that the values of the remaining rows and columns from the second row and the fourth column become '0.' For example, the power management apparatus 100 may turn off the load 4, control the operation level of the load 1 to the 2nd level, and control the operation level of the load 2 to the 1st level. Also, the power management apparatus 100 may maintain the operation level of the load 3 recently operated by the user to the 3rd level.

When a predetermined reference time (for example, five minutes) elapses after the user operates the convenience load 16, the priority of the convenience load 16 operated by the user is lowered. For example, when the predetermined reference time elapses after the user operates the convenience load 16, and then the amount of power availability of the convenience load 16 is less than the amount of power consumption of the convenience load 16, the power management apparatus 100 may select the convenience load 16 to be reduced of the amount of power consumption and reduce the amount of power consumption of the selected convenience load 16 as described in FIG. 5.

In other words, as illustrated in FIG. 7, the power management apparatus 100 may sum the values from the first row and the first column to the first row and the fourth column of the current power consumption table 300, sum the values from the second row and the first column to the second row and the fourth column, and sum the values from the third row and the first column to the third row and the fourth column. The power management apparatus 100 may determine whether the sum of the values of the respective rows and columns is greater than the amount of power availability of the convenience load 16 while summing the values of the respective rows and columns of the current power consumption table 300.

As illustrated in FIG. 7, the sum of the values up to the second row and the fourth column of the current power consumption table 300 may be 150, and the sum of the values up to the second row and the fourth column is greater than the amount of power availability 140 W of the convenience load 16. The power management apparatus 100 may control the amount of power consumption of the convenience load 16 so that the values of the remaining rows and columns from the second row and the fourth column become '0.' For example, the power management apparatus 100 may turn off the load 4, control the operation level of the load 1 to the 2nd level, and control the operation level of the load 2 to the 1st level.

Figure 8:
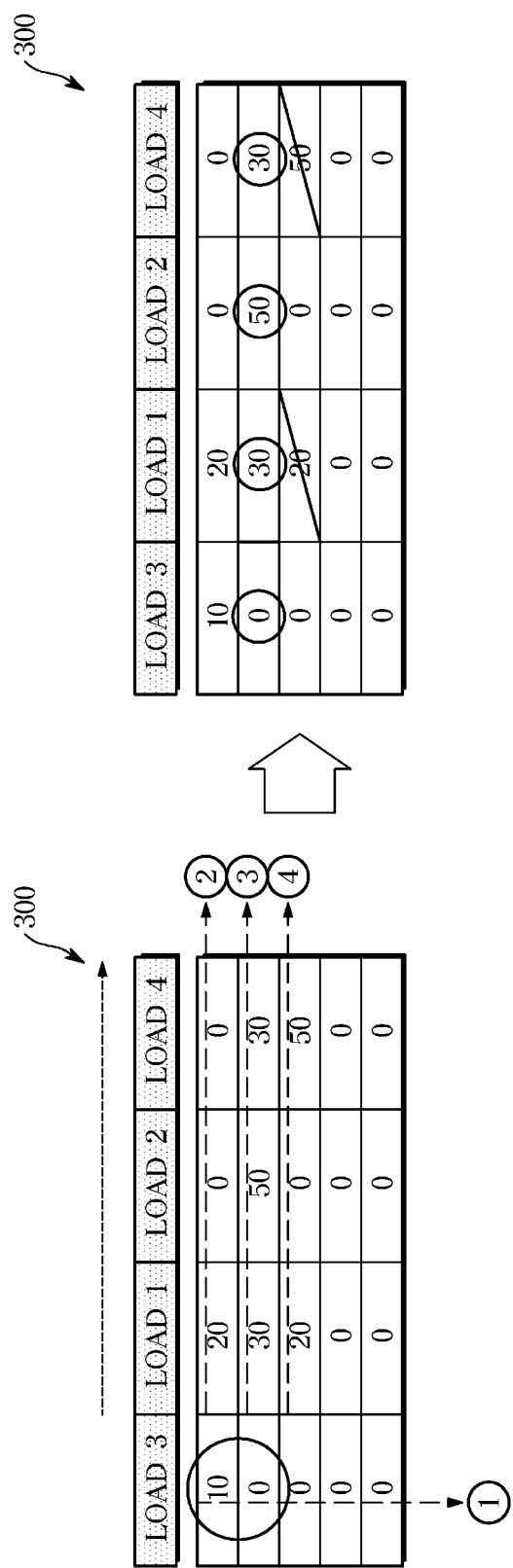
FIGS. 8 and 9 are views illustrating another example of reducing power consumption of a convenience load using a current power consumption table stored in a power management apparatus according to embodiments of the disclosure.
Figure 9:
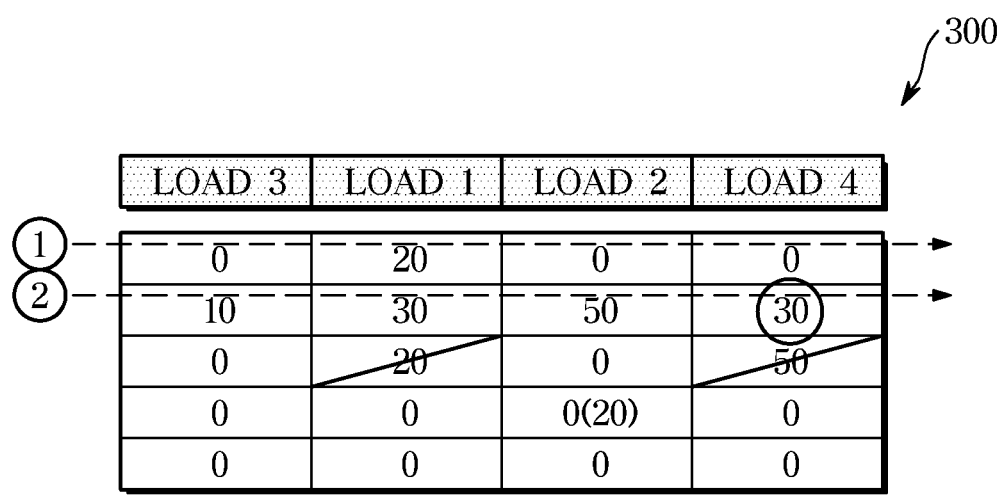

FIGS. 8 and 9 are views illustrating another example of reducing power consumption of a convenience load using a current power consumption table stored in a power management apparatus according to embodiments of the disclosure.

The priority of the convenience load 16 may be changed depending on the convenience load 16 of the user. The convenience load 16 that the user has recently used may have the higher priority.

For example, when the user lowers the operation level of the load 3 from the 2nd level to the 1st level, the power management apparatus 100 may move the amount of power consumption of the load 3 to the first column of the current power consumption table 300, as illustrated in FIG. 8. The power management apparatus 100 may also move the amount of power consumption of the load 1 to the second column and move the amount of power consumption of the load 2 to the third column.

In addition, since the operation level of the load 3 becomes the 1st level, the power management apparatus 100 may input '0' to the first row and the second column of the current power consumption table 300 based on the reference power consumption table 200.

When the amount of power availability of the convenience load 16 is less than the amount of power consumption of the convenience load 16, the power management apparatus 100 may select the convenience load 16 to reduce the amount of power consumption based on the current power consumption table 300, and reduce the amount of power consumption of the selected convenience load 16.

The power management apparatus 100 may calculate the sum of all the values of the first column representing the amount of power consumption of the load 3 operated by the user as illustrated in FIG. 8. Then, the power management apparatus 100 may sum the values from the first row and the second column to the first row and the fourth column, sum the values from the second row and the second column to the second row and the fourth column, and sum the values from the third row and the second column to the third row and the fourth column.

When the predetermined reference time (for example, five minutes) elapses after the user operates the convenience load 16, the priority of the convenience load 16 operated by the user is lowered.

As illustrated in FIG. 9, the power management apparatus 100 may sum the values from the first row and the first column to the first row and the fourth column of the current power consumption table 300, sum the values from the second row and the first column to the second row and the fourth column, and sum the values from the third row and the first column to the third row and the fourth column.

Figure 10:
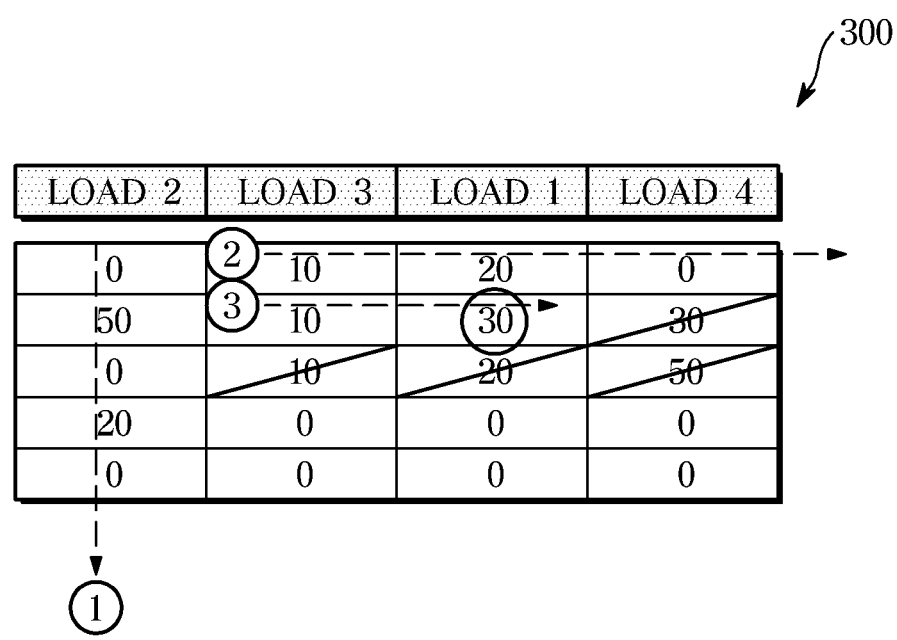
FIG. 10 is a view illustrating another example of reducing power consumption of a convenience load using a current power consumption table stored in a power management apparatus according to embodiments of the disclosure.

FIG. 10 is a view illustrating another example of reducing power consumption of a convenience load using a current power consumption table stored in a power management apparatus according to embodiments of the disclosure.

The priority of the convenience load 16 may be changed depending on the convenience load 16 of the user. The convenience load 16 that the user has recently used may have the higher priority.

For example, as illustrated in FIG. 10, the user may raise the operation level of the load 3 from the 2nd level to the 3rd level, and then raise the operation level of the load 2 from the 1st level to the 2nd level.

The power management apparatus 100 may move the amount of power consumption of the load 2 to the first column of the current power consumption table 300, as illustrated in FIG. 10. The power management apparatus 100 may also move the amount of power consumption of the load 3 to the second column and move the amount of power consumption of the load 1 to the third column.

In addition, since the operation level of the load 3 becomes the 2nd level, the power management apparatus 100 may input '20' to the first row and the third column of the current power consumption table 300 based on the reference power consumption table 200.

When the amount of power availability of the convenience load 16 is less than the amount of power consumption of the convenience load 16, the power management apparatus 100 may select the convenience load 16 to reduce the amount of power consumption based on the current power consumption table 300, and reduce the amount of power consumption of the selected convenience load 16.

The power management apparatus 100 may calculate the sum of all the values of the first column representing the amount of power consumption of the load 3 operated by the user as illustrated in FIG. 10. Then, the power management apparatus 100 may sum the values from the first row and the second column to the first row and the fourth column, sum the values from the second row and the second column to the second row and the fourth column, and sum the values from the third row and the second column to the third row and the fourth column.

Figure 11:
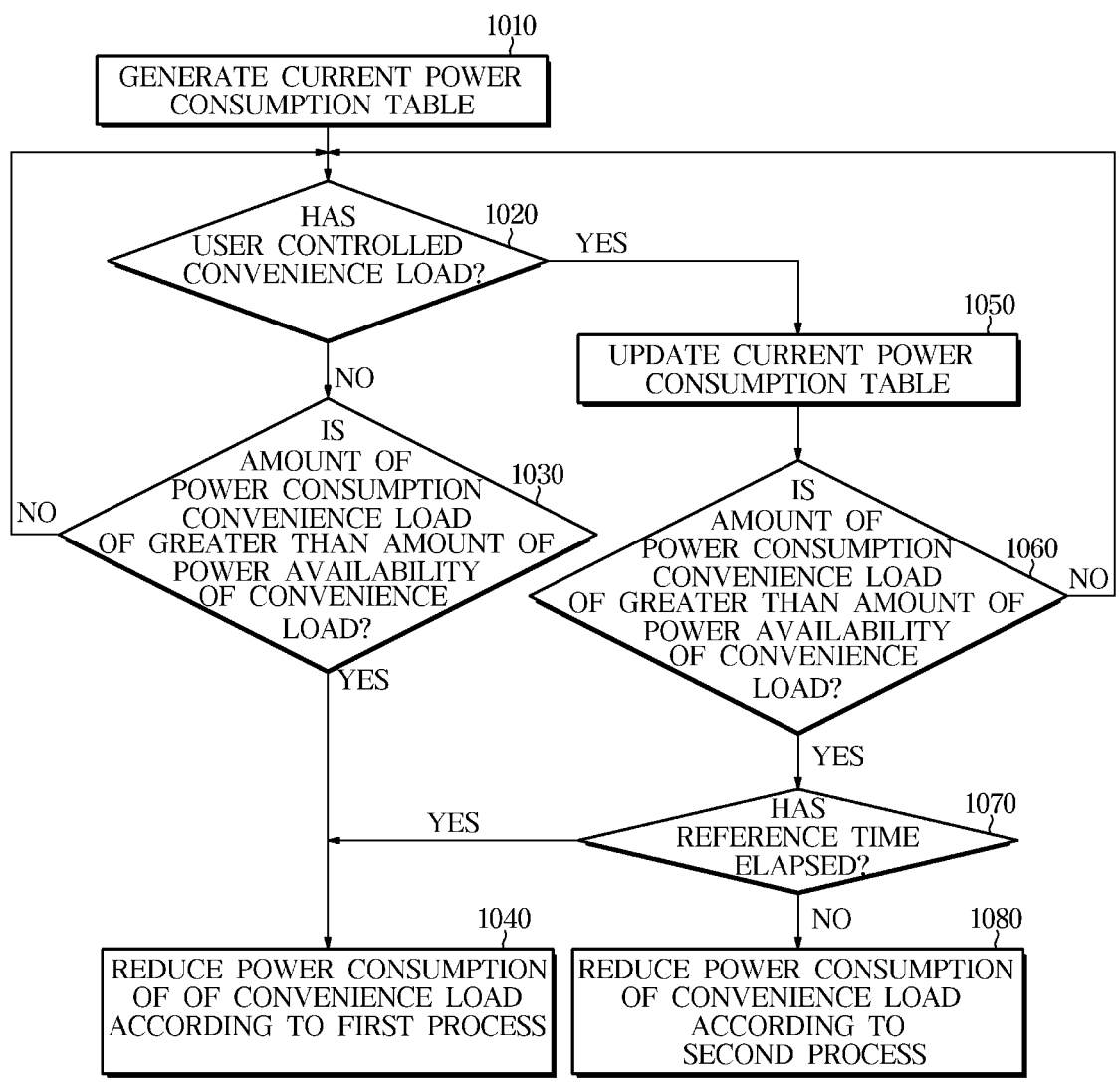
FIG. 11 is a view illustrating a method of reducing power consumption of a convenience load by a power management apparatus according to embodiments of the disclosure.

FIG. 11 is a view illustrating a method of reducing power consumption of a convenience load by a power management apparatus according to embodiments of the disclosure.

Referring to FIG. 11, the power management apparatus 100 may generate the current power consumption table 300 (1010).

The power management apparatus 100 may receive the operation level and power consumption of the convenience load 16 received from the convenience load 16 through the vehicle communication network NT. The power management apparatus 100 may generate the reference power consumption table 200 based on the operation level and power consumption of the received convenience load 16.

The power management apparatus 100 may also generate the current power consumption table 300 based on the reference power consumption table 200 and the current operation level of the convenience load 16.

The power management apparatus 100 may determine whether the user operated the convenience load 16 (1020).

The power management apparatus 100 may determine whether the user has turned on or off the convenience load 16 or changed the operation level of the convenience load 16, for example.

When it is determined that the user has not operated the convenience load 16 (NO in 1020), the power management apparatus 100 may determine whether the amount of power consumption of the convenience load 16 is greater than the amount of power availability of the convenience load 16 (1030).

The power management apparatus 100 may calculate the amount of power availability of the convenience load 16 based on the power generation information of the generator 11c and the charging information of the battery B, and may calculate the amount of power consumption of the convenience load 16 based on the consumption information of the electronic components 10.

The power management apparatus 100 may compare the amount of power consumption of the convenience load 16 with the amount of power availability of the convenience load 16.

When the amount of power consumption of the convenience load 16 is not greater than the amount of power availability of the convenience load 16 (NO in 1030), the power management apparatus 100 may monitor whether the user operates the convenience load 16.

When the amount of power consumption of the convenience load 16 is greater than the amount of power availability of the convenience load 16, the power management apparatus 100 may reduce the power consumption of the convenience load 16 according to a first process (1040).

When the amount of power availability of the convenience load 16 is less than the amount of power consumption of the convenience load 16, the power management apparatus 100 may select the convenience load 16 to reduce the amount of power consumption based on the current power consumption table 300, and reduce the amount of power consumption of the selected convenience load 16.

The power management apparatus 100 may sum the values of the respective rows and columns according to a predetermined priority for the respective rows and columns. For example, the power management apparatus 100 may sum the values of the respective columns in order according to the priority determined in the high-priority row, and then sum the values of the respective columns in order according to the priority determined in the other low-priority row.

While summing the values of the respective rows and columns, the power management apparatus 100 may determine whether the sum of the values of the respective rows and columns is greater than the amount of power availability of the convenience load 16. When the sum of the values of the respective rows and columns is greater than the amount of power availability of the convenience load 16, the power management apparatus 100 may reduce the amount of power consumption of the convenience load 16 corresponding to each of the remaining rows and columns.

When it is determined that the user has operated the convenience load 16 (YES in 1020), the power management apparatus 100 may update the current power consumption table 300 (1050).

The power management apparatus 100 may move the column representing the convenience load 16 that the user has recently used to the leftmost column among the columns of the current power consumption table 300.

The power management apparatus 100 may determine whether the amount of power consumption of the convenience load 16 is greater than the amount of power availability of the convenience load 16 (1060).

When the amount of power consumption of the convenience load 16 is not greater than the amount of power availability of the convenience load 16 (NO in 1060), the power management apparatus 100 may monitor whether or not the user operates the convenience load 16.

When the amount of power consumption of the convenience load 16 is greater than the amount of power availability of the convenience load 16 (YES in 1030), the power management apparatus 100 may determine whether the predetermined reference time has elapsed after the user operates the convenience load 16 (1070).

When the predetermined reference time has not elapsed after the user operates the convenience load 16 (No in 1070), the power management apparatus 100 may reduce the power consumption of the convenience load 16 according to the first process (1040).

When the predetermined reference time has elapsed (YES in 1070) after the user operates the convenience load 16, the power management apparatus 100 reduces the power consumption of the convenience load 16 according to a second process (1080).

When the amount of power availability of the convenience load 16 is less than the amount of power consumption of the convenience load 16, the power management apparatus 100 may select the convenience load 16 to reduce the amount of power consumption based on the current power consumption table 300, and reduce the amount of power consumption of the selected convenience load 16.

The power management apparatus 100 may sum the values of the respective rows and columns of the current power consumption table 300 according to a predetermined order and determine whether the sum of the values of the respective rows and columns is greater than the amount of power availability of the convenience load 16. When the sum of the values of the respective rows and columns is greater than the amount of power availability of the convenience load 16, the power management apparatus 100 may control the amount of power consumption of the convenience load 16 corresponding to each of the remaining rows and columns.

The power management apparatus 100 may sum the values of the respective rows and columns according to a predetermined second priority for the respective rows and columns. For example, the power management apparatus 100 may sum the values included in the columns corresponding to the convenience load 16 currently operated by the user, sum the values of the respective columns in order according to the priority determined in the high-priority row, and then sum the values of the respective columns in order according to the priority determined in the other low-priority row.

While summing the values of the respective rows and columns, the power management apparatus 100 may determine whether the sum of the values of the respective rows and columns is greater than the amount of power availability of the convenience load 16. When the sum of the values of the respective rows and columns is greater than the amount of power availability of the convenience load 16, the power management apparatus 100 may reduce the amount of power consumption of the convenience load 16 corresponding to each of the remaining rows and columns.

As described above, when the amount of power availability of the convenience load 16 is less than the amount of power consumption of the convenience load 16, the power management apparatus 100 may reduce the amount of power consumption of the convenience load 16 according to the predetermined priority.

Figure 12:
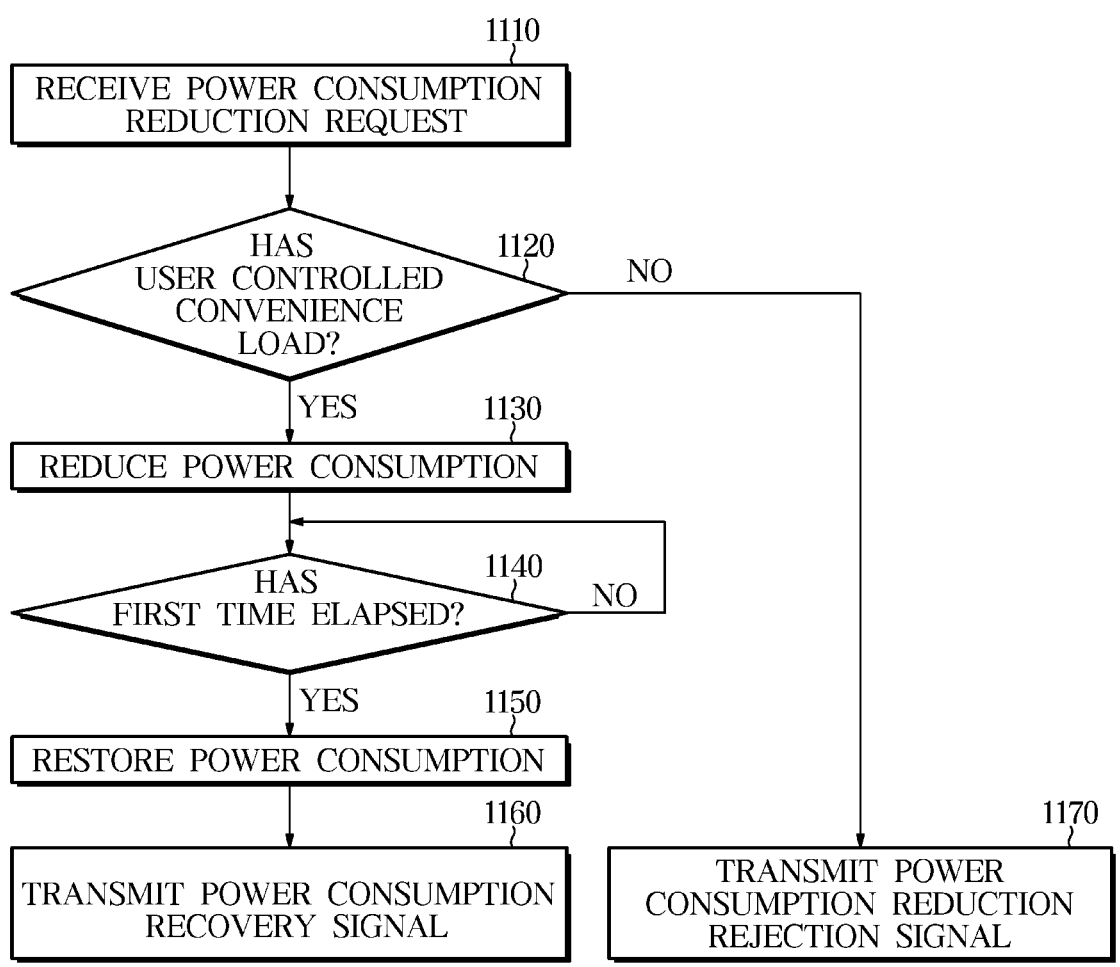
FIG. 12 is a view illustrating a method of reducing power consumption by a convenience load according to embodiments of the disclosure.

FIG. 12 is a view illustrating a method of reducing power consumption by a convenience load according to embodiments of the disclosure.

As illustrated in FIG. 12, the convenience load 16 may receive a power consumption reduction request from the power management apparatus 100 (1110).

When the amount of power availability of the convenience load 16 is less than the amount of power consumption of the convenience load 16, the power management apparatus 100 may transmit the power consumption reduction request and the operation level to the convenience load 16.

The convenience load 16 may determine whether the power consumption reduction is possible (1120).

The convenience load 16 may determine whether a malfunction of the convenience load 16 or the vehicle is expected, or the driver's discomfort is expected by the power consumption reduction, for example.

When the power consumption reduction is possible (YES in 1120), the convenience load 16 may reduce the power consumption (1130).

The convenience load 16 may control the operating level to the level received from the power management apparatus 100.

The convenience load 16 may determine whether a first time has elapsed (1140).

When the first time has elapsed (YES in 1140), the convenience load 16 may restore the power consumption to an original state (1150).

The convenience load 16 may restore the operation level to a level before the power consumption reduction.

Thereafter, the convenience load 16 may transmit a power consumption recovery signal to the power management apparatus 100 (1160).

After restoring the operating level to the level prior to the power consumption reduction, the convenience load 16 may inform the power management apparatus 100 of a restoration of the operating level.

When the power consumption reduction is not possible (NO in 1120), the convenience load 16 may transmit a power consumption reduction rejection signal to the power management apparatus 100 (1170).

In response to the power consumption reduction rejection signal, the power management apparatus 100 may again select the convenience load 16 to be reduced of the power consumption in view of the power consumption reduction rejection signal.

Figure 13:
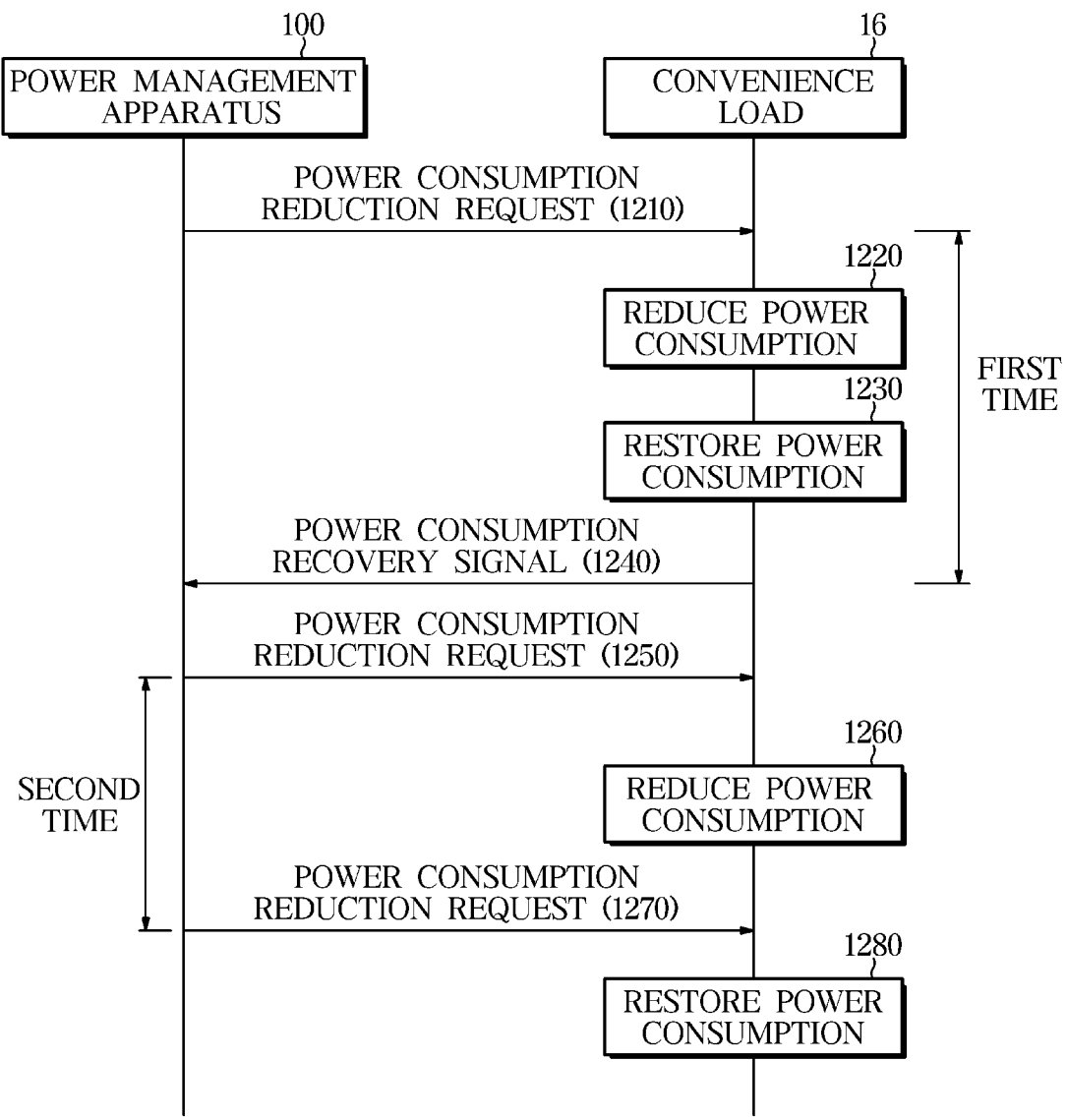
FIG. 13 is a view illustrating a power reduction cooperation operation between a power management apparatus and a convenience load according to embodiments of the disclosure.

FIG. 13 is a view illustrating a power reduction cooperation operation between a power management apparatus and a convenience load according to embodiments of the disclosure.

Referring to FIG. 13, the power management apparatus 100 may transmit the power consumption reduction request to the convenience load 16 (1210).

In response to the power consumption reduction request, the convenience load 16 may reduce the power consumption (1220).

After the first time has elapsed, the convenience load 16 may restore the power consumption (1230). The first time may be approximately 10 seconds.

The convenience load 16 may transmit the power consumption recovery signal to the power management apparatus 100 (1240).

The power management apparatus 100 may again transmit the power consumption reduction request to the convenience load 16 (1250). The power management apparatus 100 may periodically transmit the power consumption reduction request to the convenience load 16.

In response to the power consumption reduction request, the convenience load 16 may reduce the power consumption (1260).

When the power consumption recovery signal is not received from the convenience load 16 within a second time, the power management apparatus 100 may transmit the power consumption recovery request to the convenience load 16 (1270).

The second time may be approximately 12 seconds.

The convenience load 16 may restore the power consumption (1230).

In response to the power consumption recovery request of the power management apparatus 100, the convenience load 16 may recover the power consumption.

Figure 14:
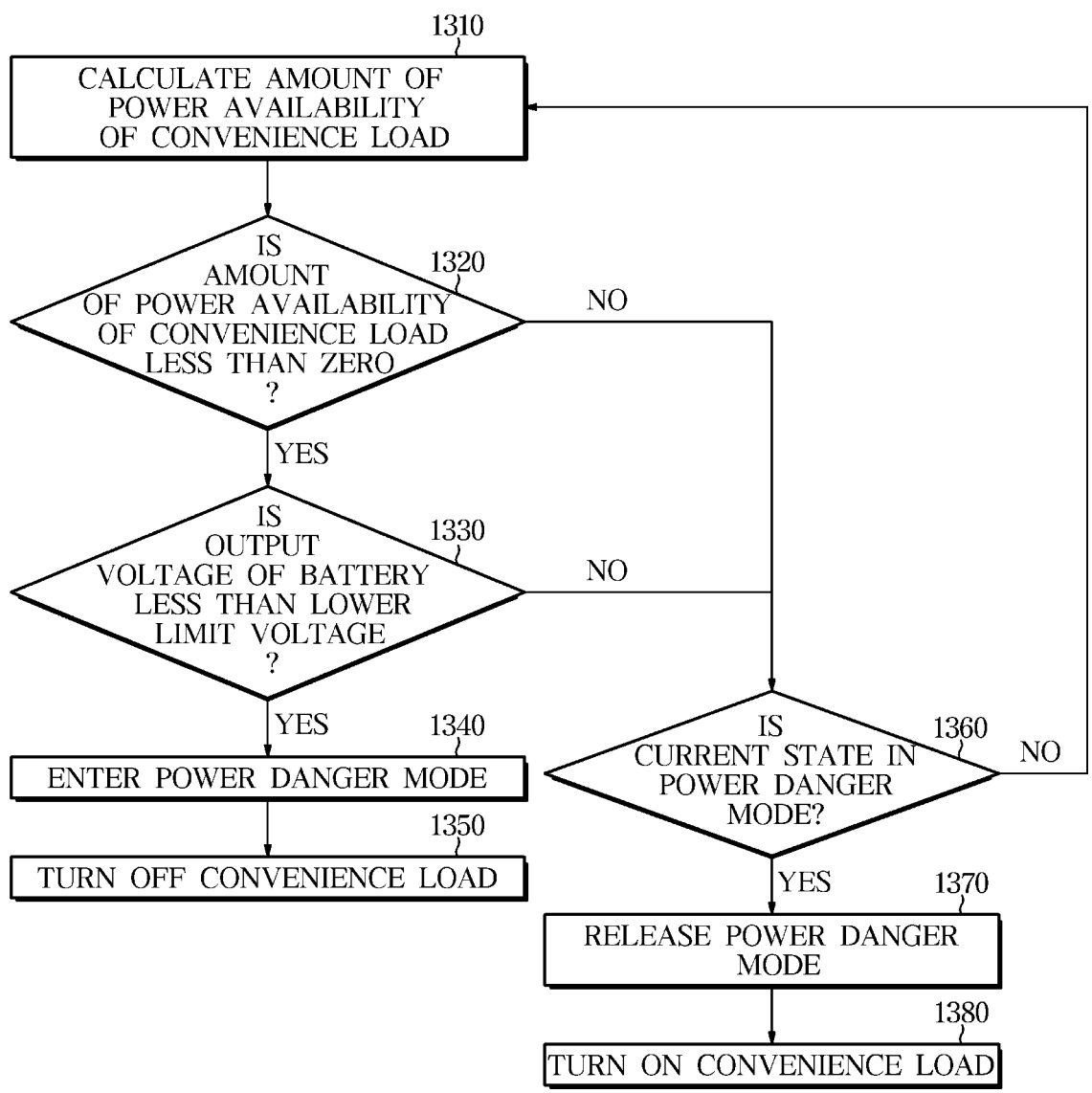
FIG. 14 is a view illustrating a method of controlling a convenience load in a dangerous situation of a power management apparatus according to embodiments of the disclosure.

FIG. 14 is a view illustrating a method of controlling a convenience load in a dangerous situation of a power management apparatus according to embodiments of the disclosure.

Referring to FIG. 14, the power management apparatus 100 may calculate the amount of power availability of the convenience load 16 (1310).

The power management apparatus 100 may calculate the amount of power consumption of the convenience load 16 based on the consumption information of the electronic components 10.

The power management apparatus 100 may determine whether the amount of power availability of the convenience load 16 is less than '0' (1320).

The power management apparatus 100 may compare the amount of power availability of the convenience load 16 with '0.'

When the amount of power supply availability of the convenience load 16 is less than 0 (YES in 1320), the power management apparatus 100 may determine whether the output voltage of the battery B is less than a lower limit voltage.

The lower limit voltage of the battery B may be, for example, 9V.

The power management apparatus 100 can compare the output voltage of the battery B with the lower limit voltage.

When the output voltage of the battery B is lower than the lower limit voltage (YES in 1330), the power management apparatus 100 may enter a power danger mode (1340).

Thereafter, the power management apparatus 100 may turn off the convenience load 16 (1350).

The power management apparatus 100 may transmit a load off request to the convenience load 16.

When the amount of power availability of the convenience load 16 is not less than '0' (NO in 1320) or the output voltage of the battery B is not less than the lower limit voltage (NO in 1330), the power management apparatus 100 may determine whether the current state is the power danger mode (1360).

When the current state is not the power danger mode (NO in 1360), the power management apparatus 100 may again calculate the amount of power availability of the convenience load 16.

When the current state is the power danger mode (YES in 1360), the power management apparatus 100 may release the power danger mode (1370).

Thereafter, the power management apparatus 100 may turn on the convenience load 16 (1380).

The power management apparatus 100 may transmit a load on request to the convenience load 16.

Figure 15:
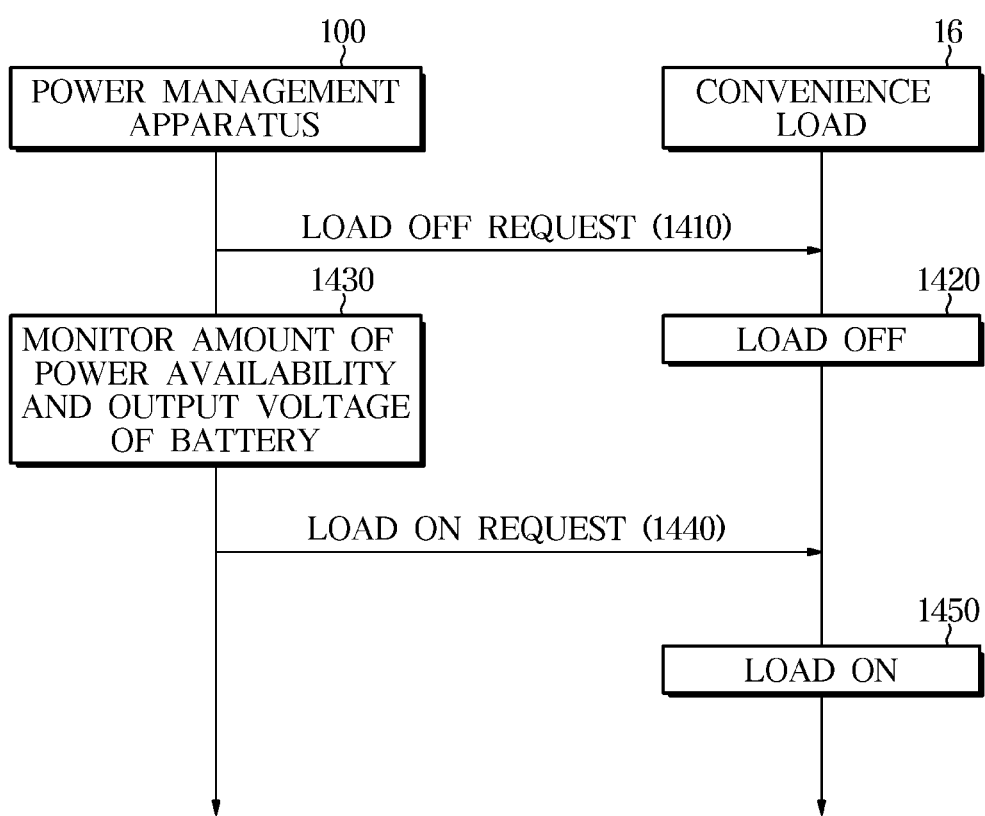
FIG. 15 is a view illustrating a cooperation operation in a dangerous situation of a power management apparatus and a convenience load according to embodiments of the disclosure.

FIG. 15 is a view illustrating a cooperation operation in a dangerous situation of a power management apparatus and a convenience load according to embodiments of the disclosure.

Referring to FIG. 15, the power management apparatus 100 may transmit a load off request to the convenience load 16 (1410).

The power management apparatus 100 may transmit the load off request to the convenience load 16 when the amount of power availability of the convenience load 16 is less than '0' and the output voltage of the battery B is less than the lower limit voltage.

The convenience load 16 may turn off the electric load (1420).

In response to the load off request, the convenience load 16 may turn off the electric load, and the controller that controls the operation of the electric load may maintain its function.

After transmitting the load off request, the power management apparatus 100 may monitor the amount of power availability of the convenience load 16 and the output voltage of the battery B (1430).

The power management apparatus 100 may transmit the load on request to the convenience load 16 (1440).

The power management apparatus 100 may transmit the load on request to the convenience load 16 when the amount of power availability of the convenience load 16 is greater than '0' or when the output voltage of the battery B is greater than the lower limit voltage.

The convenience load 16 may turn on the electric load (1450).

In response to the load on request, the convenience load 16 may activate the electric load to a '0' level and activate the electric load to the operating level prior to off.

According to the vehicle of an aspect and the method of controlling the vehicle as described above, the power consumption of the battery may efficiently be limited.

According to the vehicle of another aspect and the method of controlling the vehicle as described above, the disclosure may control the power consumption of electronic components using in-vehicle communication in response to a shortage of momentary power supply.

Exemplary embodiments of the disclosure have been described above. In the exemplary embodiments described above, some components may be implemented as a "module." Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any of the above described exemplary embodiments. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording mediums. The medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of the disclosure, will appreciate that other embodiments can be devised which do not depart from the scope as disclosed herein. Accordingly, the scope should be limited only by the attached claims.

What is claimed is:

1. A vehicle comprising:
   a battery;
   a plurality of convenience loads; and
   a power management apparatus configured to control operations of the plurality of convenience loads based on a state of charge of the battery, wherein the power management apparatus is configured to:
      store a power consumption table that includes information related to power consumption depending on operation levels of the plurality of convenience loads and a priority depending on operation levels of the plurality of convenience loads;
      calculate an amount of power availability based on the state of charge of the battery;
      calculate an amount of power consumption based on operation information of the plurality of convenience loads; and
      lower the operation levels of the convenience loads based on the power consumption table when the amount of power consumption is greater than the amount of power availability.

2. The vehicle according to claim 1, wherein the power management apparatus is configured to:
   reduce the power consumption of the convenience loads based on the power consumption table according to a first process when the amount of power consumption is greater than the amount of power availability;
   reduce the power consumption of the convenience loads based on the power consumption table according to the first process when a reference time has elapsed since the convenience load was operated by a user; and
   reduce the power consumption of the convenience loads based on the power consumption table according to a second process different from the first process when the reference time has not elapsed since the convenience load was operated by the user.

3. The vehicle according to claim 1, wherein the power consumption table comprises a plurality of rows and a plurality of columns;
   wherein the plurality of columns correspond to the plurality of convenience loads, respectively; and
   wherein the plurality of rows correspond to the operation levels of the convenience loads, respectively.

4. The vehicle according to claim 3, wherein the plurality of rows and the plurality of columns have different priorities.

5. The vehicle according to claim 4, wherein the plurality of rows and the plurality of columns of the power consumption table comprise the amount of power consumption depending on the operation level of each of the plurality of convenience loads.

6. The vehicle according to claim 5, wherein the power management apparatus is configured to:
sum the values of respective rows and columns according to a predetermined priority of the respective rows and columns when the amount of power consumption is greater than the amount of power availability; and
reduce the amount of power consumption of the convenience load that corresponds to the remaining rows and columns when the sum of the values of the rows and columns is greater than the amount of power availability.

7. The vehicle according to claim 3, wherein the power management apparatus is configured to raise a priority of the convenience load operated by a user when the convenience load is operated by the user.

8. The vehicle according to claim 7, wherein the power management apparatus is configured to change positions of values of columns, which correspond to the convenience load operated by the user, in the power consumption table.

9. The vehicle according to claim 7, wherein the power management apparatus is configured to:
sum values of the respective rows and columns according to a predetermined priority of respective rows and columns when a reference time has elapsed since the convenience load was operated by the user; and
reduce the amount of power consumption of the convenience load corresponding to the remaining rows and columns when the sum of the values of the rows and columns is greater than the amount of power availability.

10. The vehicle according to claim 7, wherein the power management apparatus is configured to:
when a reference time has not elapsed since the convenience load was operated by the user, sum all the values of the columns, which correspond to the convenience load operated by the user, and then sum the values of respective rows and columns according to a predetermined priority of the respective rows and columns; and
when the sum of the values of the rows and columns is greater than the amount of power availability, reduce the amount of power consumption of the convenience load corresponding to the remaining rows and columns.

11. A method of controlling a vehicle that includes a battery and a plurality of convenience loads, the method comprising:
storing a power consumption table that includes information related to power consumption depending on operation levels of the plurality of convenience loads and a priority depending on operation levels of the plurality of convenience loads;
calculating an amount of power availability based on a state of charge of the battery;
calculating an amount of power consumption based on operation information of the plurality of convenience loads; and
lowering the operation levels of the convenience loads based on the power consumption table when the amount of power consumption is greater than the amount of power availability.

12. The method according to claim 11, wherein lowering the operation levels of the convenience loads comprises:
reducing the power consumption of the convenience loads based on the power consumption table according to a first process when the amount of power consumption is greater than the amount of power availability;
reducing the power consumption of the convenience loads based on the power consumption table according to the first process when a reference time has elapsed since the convenience load was operated by a user; and
reducing the power consumption of the convenience loads based on the power consumption table according to a second process different from the first process when the reference time has not elapsed since the convenience load was operated by the user.

13. The method according to claim 11, wherein the power consumption table comprises a plurality of rows and a plurality of columns,
wherein the plurality of columns correspond to the plurality of convenience loads, respectively, and
wherein the plurality of rows correspond to the operation levels of the convenience loads, respectively.

14. The method according to claim 13, wherein the plurality of rows and the plurality of columns have different priorities.

15. The method according to claim 14, wherein the plurality of rows and the plurality of columns of the power consumption table comprise the amount of power consumption of each convenience load depending on the operation level of the plurality of convenience loads.

16. The method according to claim 15, wherein lowering the operation levels of the convenience loads comprises:
summing values of the respective rows and columns according to a predetermined priority of the respective rows and columns when the amount of power consumption is greater than the amount of power availability; and
reducing the amount of power consumption of the convenience load corresponding to the remaining rows and columns when the sum of the values of the rows and columns is greater than the amount of power availability.

17. The method according to claim 13, wherein lowering the operation levels of the convenience loads comprises raising a priority of the convenience load operated by a user when the convenience load is operated by the user.

18. The method according to claim 17, wherein lowering the operation levels of the convenience loads comprises changing positions of values of columns that correspond to the convenience load operated by the user in the power consumption table.

19. The method according to claim 17, wherein lowering the operation levels of the convenience loads comprises:
summing the values of respective rows and columns according to a predetermined priority of the respective rows and columns when a reference time has elapsed since the convenience load was operated by the user; and
reducing the amount of power consumption of the convenience load corresponding to the remaining rows and columns when the sum of the values of the rows and columns is greater than the amount of power availability.

20. The method according to claim 17, wherein lowering the operation levels of the convenience loads comprises:
when a reference time has not elapsed since the convenience load was operated by the user, summing all the values of the columns that correspond to the convenience load operated by the user, and then summing the values of respective rows and columns according to a predetermined priority of the respective rows and columns; and when the sum of the values of the rows and columns is greater than the amount of power availability, reducing the amount of power consumption of the convenience load corresponding to the remaining rows and columns.

\* \* \* \* \*